United States Patent [19]

Renner et al.

[11] Patent Number: 4,569,017
[45] Date of Patent: Feb. 4, 1986

[54] DUPLEX CENTRAL PROCESSING UNIT SYNCHRONIZATION CIRCUIT

[75] Inventors: Robert E. Renner, Glendale; Thomas J. Perry, Phoenix, both of Ariz.

[73] Assignee: GTE Automatic Electric Incorporated, Northlake, Ill.

[21] Appl. No.: 564,132

[22] Filed: Dec. 22, 1983

[51] Int. Cl.[4] ............................................. G06F 15/16
[52] U.S. Cl. .................................................. 364/200
[58] Field of Search ... 364/200 MS File, 900 MS File; 371/1, 9, 47; 179/18 ES, 18 EE

[56] References Cited

U.S. PATENT DOCUMENTS

| | | | |
|---|---|---|---|
| 3,602,900 | 8/1971 | Delalgue | 364/200 |
| 3,761,884 | 9/1973 | Avsan et al. | 364/200 |
| 3,898,621 | 8/1975 | Zelinski et al. | 364/200 |
| 4,021,784 | 5/1977 | Kimlinger | 364/200 |
| 4,059,736 | 11/1977 | Perucca et al. | 364/200 |
| 4,059,850 | 11/1977 | Van Eck et al. | 364/200 |
| 4,099,241 | 7/1978 | Ossfeldt | 364/200 |
| 4,270,167 | 5/1981 | Koehler et al. | 364/200 |
| 4,405,898 | 9/1983 | Flemming | 364/900 |

FOREIGN PATENT DOCUMENTS 1444067 7/1976 United Kingdom ............... 364/200

Primary Examiner—James D. Thomas
Assistant Examiner—William G. Niessen
Attorney, Agent, or Firm—Frank J. Bogacz; Peter Xiarhos

[57] ABSTRACT

This circuit provides for synchronizing the internal clocks of at least two central processing unit process controllers. In order to synchronize the internal clocks of these central processing units (CPUs), the CPUs periodically execute a predetermined set of operating instructions which cause their internal clocks to coincide. This synchronization function is dynamic in that it is continually performed in an on-line fashion while the processors are performing their telecommunication process control function.

10 Claims, 3 Drawing Figures

FIG. I

DUPLEX CENTRAL PROCESSING UNIT SYNCHRONIZATION CIRCUIT

BACKGROUND OF THE INVENTION

The present invention pertains to controllers for operating a telecommunication process and more particularly to internal clock synchronization of multiple central processing units.

Public policy requires that telecommunication systems provide virtually uninterrupted service to its subscribers over long periods of time. Providing redundant circuitry is an aid in meeting this public policy requirement.

However, simple duplication of circuitry creates a problem of simultaneous operation of the circuitry. In order to meet the objective of no loss of service for long periods of time, it is undesirable for telecommunication system outages to occur during a change-over from one copy of the duplicated circuitry to the redundant back-up copy of the circuitry.

Modern telecommunication systems employ multiprocessing arrangements of central processing units in order to accomplish their switching operations. The central processing units (CPUs) of this multiprocessing arrangement may be synchronized in order to avoid loss of service during change-over operations. Typically, central processing unit synchronization has been performed by a vast amount of clock circuitry, which provides the driving signals to the CPUs. With the advent of single chip microprocessor CPUs, this synchronization function is made difficult. Since much of the clocking function of these single chip microprocessor CPUs is internal to the chip package, synchronizing multiple CPU is more complex.

SUMMARY OF THE INVENTION

In a telecommunication system which has a system clock, a CPU synchronization circuit is connected between the system clock and at least two CPU copies. The system clock operates to produce two distinct periodic signals. The goal of the CPU synchronization circuit is to ensure that all the CPUs are executing the same machine state of the same machine cycle at the same time. This is accomplished by synchronizing the internal clocks of the CPUs.

Each of the CPUs of each copy includes a clock input lead which connects the system clock to each CPU copy; a status output lead which is capable of providing information as to the particular machine state and cycle of the CPU; and an address latch enable output lead, which provides proper timing for interrogation of the state of the status output lead. At the appropriate CPU machine state, a production arrangement yields a predefined value via the status output lead of each CPU copy.

Each CPU copy also includes a generating apparatus which is connected to the corresponding CPU copy via the status output lead and via the address latch output lead. The generating apparatus operates in response to the production of the predefined value of the status output lead to produce an inhibit signal.

Lastly, each CPU copy includes a gating arrangement which is connected to the system clock, to the generating apparatus and to the corresponding CPU of its copy. The gating arrangement operates in response to the inhibit signal and the second periodic signal to prevent one of the first periodic signals from being received by one corresponding CPU copy. As a result, one CPU copy is slowed by one periodic signal and the other CPU copy is unchanged, resulting in synchronization of the two CPU copies.

DESCRIPTION OF THE PREFERRED EMBODIMENT

Figure 1:
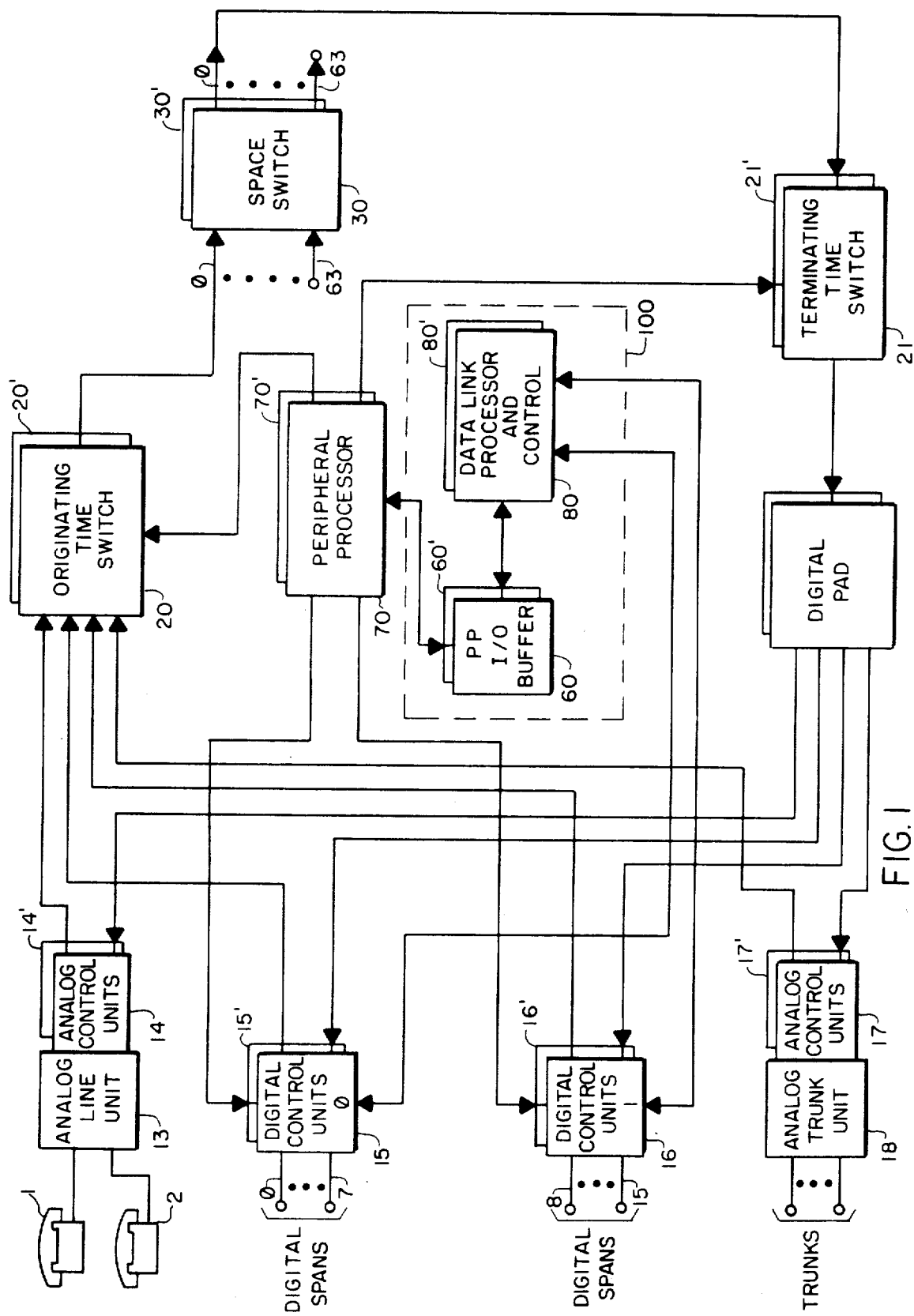
FIG. 1 is a block diagram of the telecommunication system embodying the present invention.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to a duplex pair of space switch units 30 and 30' which are in turn connected to a duplex pair of terminating time switches 21 and 21'. Terminating time switches 21 and 21' are connected to analog control units 14 and 14' via digital pad devices and ultimately to the telephone subscribers 1 and 2 via analog line circuit 13. Digital control units 15, 15' and 16, 16' connect the digital spans to the switching network. Digital span equipment may be implemented using a model 9004 T1 digital span, manufactured by GTE Lenkurt, Inc. Similarly, analog trunk unit 18 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15, 15' and 16, 16' control the incoming PCM data from the digital spans. Similarly, the analog trunk unit 18 and a duplex pair of analog control units 17 and 17' interface to trunk circuits. The analog and digital control units are each duplicated for reliability purposes.

The network of FIG. 1 also includes a Remote Data Link Controller (RDLC) 100 which provides formatting and control of data transmitted and received between the peripheral processors of two or more networks. The RDLC can provide up to 16, 64 kilobits per second data links arranged for full duplex operation and is configured so that it can provide one full duplex data link for each of the 16 T1 spans. RDLC 100 can operate together with one or two digital control unit (DCUs), with each DCU being capable of providing up to eight T1 carrier facilities.

RDLC 100 includes a duplicated data link processor and control 80 and 80' and a duplicated peripheral processor I/O buffer 60 and 60'.

Each RDLC message consists of eight, 8-bit bytes of data for a total of 64 bits. The peripheral processor I/O buffer provides four transmit message buffers and four receive message buffers for each of the 16 possible data links.

Normally, peripheral processor software writes a message into a transmit message buffer of peripheral processor I/O buffer 60 and 60' associated with a data link and then issues a transmit command to data link processor and control 80 and 80'. The data link processor and control 80 and 80' responds by taking the message out of the transmit message buffer and reformatting the data, so that it can be transmitted over a T1 carrier. Then data link processor and control 80 and 80' transmits the message to the distant end of the data link through the appropriate DCU and digital span.

When a message is received, the data link processor and control 80 and 80' reformats the received data and places the message into an appropriate receive message buffer in the peripheral I/O buffer 60 and 60' respectively. Data link processor and control 80 and 80' then causes an interrupt, alerting peripheral processor 70 and 70' to the fact that a message has been received. The RDLC will queue up to three received messages. It should be noted that under normal operating conditions, the RDLC operates in a duplex configuration, that is, each RDLC copy matches all outgoing signals performed in the DCUs.

In order to synchronize the two RDLC copies, it is necessary to ensure that both of their peripheral processors 70 and 70' are performing the same function at the same time. Each peripheral processor includes an Intel 8085A or 8085A-2 8-bit parallel central processing unit (CPU). Intel is a registered trademark of the Intel Corporation. In order to synchronize the two Intel 8085A processors, it is necessary that their respective internal clocks are synchronized to one another. The MCS-86 User's Manual, Copyright 1978 by the Intel Corporation, is hereby incorporated by reference.

Figure 2:
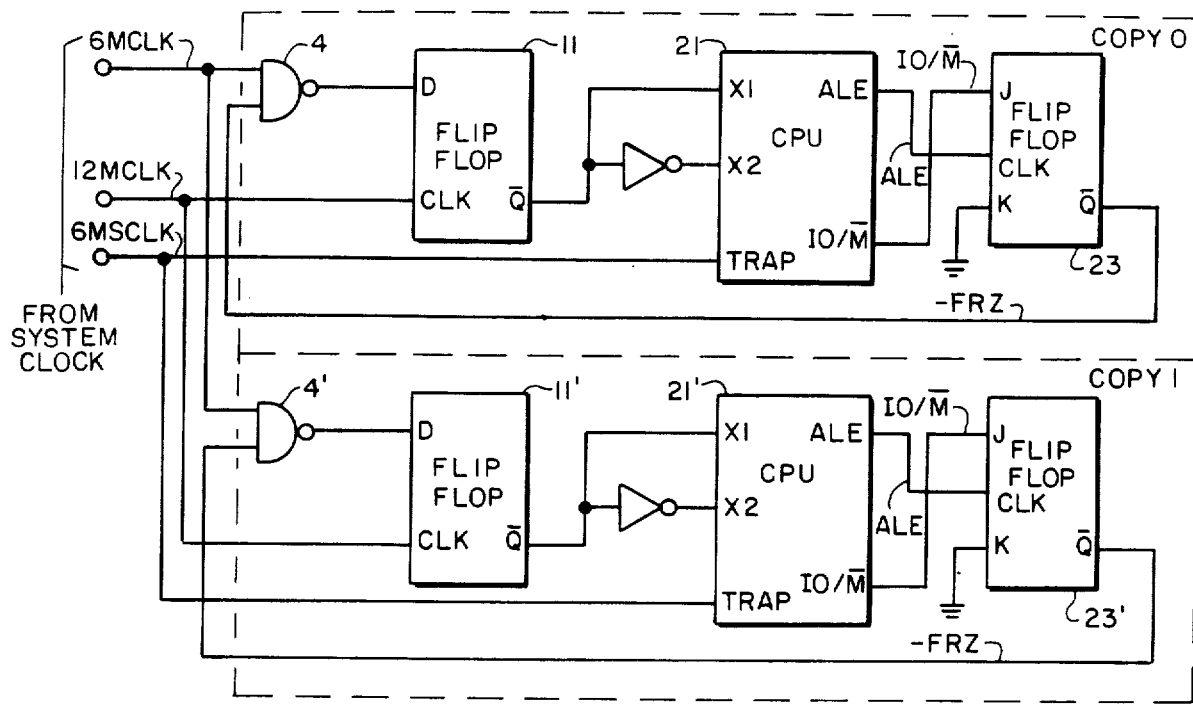
FIG. 2 is a schematic diagram of the synchronization circuitry for synchronizing the internal clocks of at least two central processing units.

Referring to FIG. 2, the Intel 8085A CPUs and associated synchronizing circuitry comprising copy 0 and copy 1 of the RDLC is shown. CPUs 21 and 21' each include two inputs X1 and X2 which are connected to a clock source and which serve to drive the internal clock generator of the 8085A processor. The input frequency is divided by two on the integrated circuit package to give the processor its internal operating frequency.

Each CPU 21 and 21' also includes a trap input. The trap input is a non-maskable restart interrupt. It is unaffected by any mask or interrupt enable and has the highest priority of any interrupt.

The central processing units 21 and 21' each produce an output signal, referred to as an address latch enable (ALE). The ALE signal occurs during the first clock state of a machine cycle (see FIG. 3) and enables the address to be latched into an on-chip latch for peripheral devices. The falling edge of the ALE signal guarantees set-up and hold times for the address information. In addition, the falling edge of the ALE signal is used to strobe the status information. The ALE signal is not three-stated.

The status information of the 8085A comprises three outputs S0, S1 and IO/$\overline{\text{M}}$. The S0 and S1 output signals are not shown in FIG. 2. These status outputs become valid at the beginning of a machine cycle and remain stable throughout the cycle. The falling edge of the ALE signal is used to latch the status of these three signals. The values of the states of these three signals are indicated by the following table:

TABLE

| IO/$\overline{\text{M}}$ | S1 | S0 | Explanation |
|---|---|---|---|
| 0 | 0 | 1 | Memory Write |
| 0 | 1 | 0 | Memory Read |
| 1 | 0 | 1 | I/O Write |
| 1 | 1 | 0 | I/O Read |
| 0 | 1 | 1 | Opcode Fetch |

TABLE-continued

| IO/$\overline{\text{M}}$ | S1 | S0 | Explanation |
|---|---|---|---|
| 1 | 1 | 1 | Interrupt Acknowledge |

As can be seen from the above table for an I/O write or read, the IO/$\overline{\text{M}}$ is a logic 1.

A system clock (not shown) generates three clock signals for use by the CPUs 21 and 21' and the synchronizing circuitry. First, the system clock generates a 6 MHz signal (a range of 1 MHz to 10 MHz may be employed) on the 6 MCLK lead. Second, the clock generates a 12 MHz signal (a range of 10 MHz to 20 MHz may be employed corresponding to the 1 MHz to 10 MHz range of the 6 MCLK lead) on the 12 MCLK lead. Lastly, the clock generates a pulse once every six milliseconds (a range of 1 Hz to 1 K Hz may be used) on the 6 MSCLK lead.

The 6 MCLK lead connects the system clock to NAND gates 4 and 4'. The other input to NAND gate 4 is connected to the $\overline{\text{Q}}$ output of flip-flop 23 via the -FRZ lead. Similarly, the other input of NAND gate 4' is connected to the $\overline{\text{Q}}$ output of flip-flop 23' via a corresponding -FRZ lead.

The output of NAND gates 4 and 4' are connected respectively to the D-inputs of flip-flops 11 and 11'. The clock is connected to the CLK-input of flip-flops 11 and 11' via the 12 MCLK lead. The Q outputs of flip-flops 11 and 11' are connected to the X1 and X2 inputs of CPUs 21 and 21' respectively. This connection to the X1 and X2 leads of the CPU is in a push-pull configuration.

The ALE output of CPUs 21 and 21' is respectively connected to the clock inputs of flip-flops 23 and 23' via the corresponding ALE lead. Similarly, the status lead IO/$\overline{\text{M}}$ of each CPU 21 and 21' is connected respectively to the J-input of flip-flops 23 and 23'. Flip-flops 23 and 23' are J-K flip-flops and flip-flops 11 and 11' are D-type flip-flops of the 7400 logic family such as those manufactured by the Texas Instruments Corporation.

Every six milliseconds a signal is produced by the clock of the 6MSCLK lead and transmitted to CPUs 21 and 21' via the trap inputs. As a result, a trap is generated by each CPU. This trap forces an internal branch to location 24 hexadecimal which contains an I/O instruction. As a result of the execution of this I/O instruction, status lead IO/$\overline{\text{M}}$ is at logic 1. Flip-flops 23 nd 23' will latch the IO$\overline{\text{M}}$ lead value on the next falling edge of the ALE signal. As a result, the -FRZ lead will go active to logic 0 (see FIG. 3).

If one of the CPUs is operating faster than the other (i.e. not in synchronization), the -FRZ lead at logic 0 will inhibit the operation of its corresponding NAND gate 4 or 4'. Thereby, flip-flop 11 or 11' will be prevented from transmitting one clock pulse to the X1 and X2 leads of the CPU which is operating faster than the other CPU. That is, if the two RDLC microprocessor copies were operating out of synchronization, one will skip a clock pulse and the other will not. As a result of this clock pulse deletion, the internal clocks of CPUs 21 and 21' will be placed in synchronization.

Figure 3:
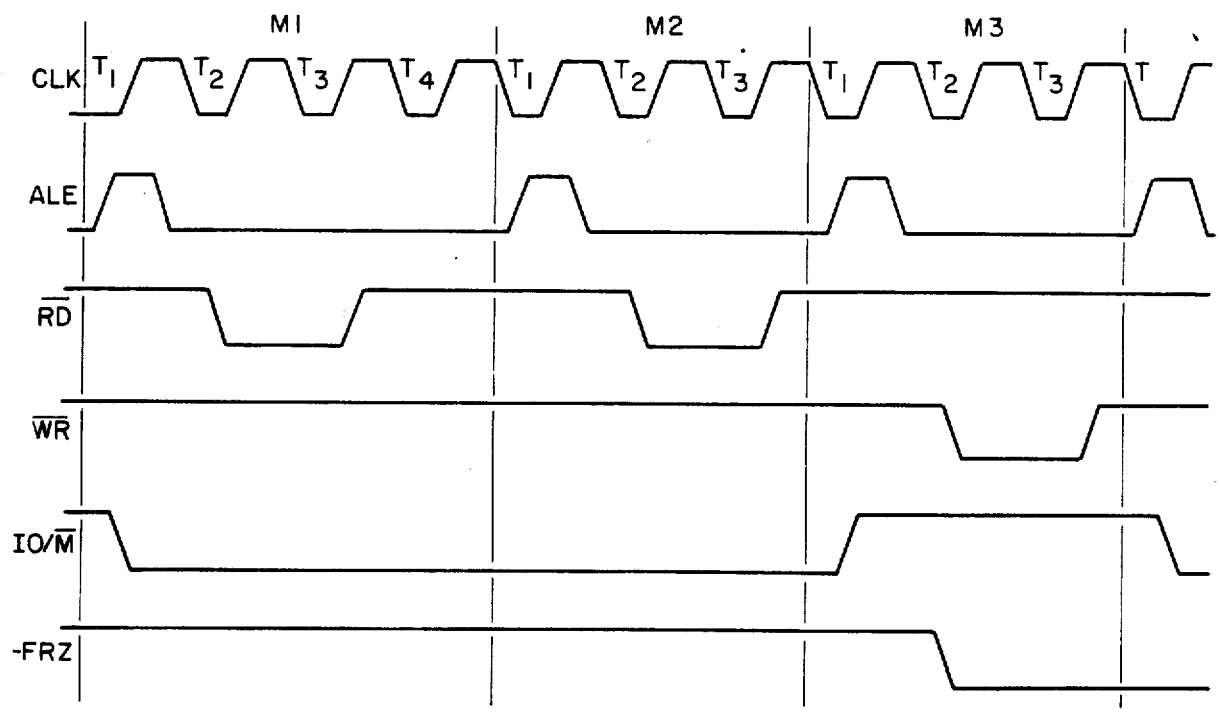
FIG. 3 is a timing diagram of various key signals for the synchronization process.

Referring to FIG. 3, the timing of the 8085A or 8085A-2 microprocessor CPU is shown. The CLK signal is the internal clock of the 8085A microprocessor. M1, M2 and M3 are three machine states which depict an instruction fetch, a memory read and an I/O write cycle respectively. ALE is the address latch enable signal which occurs during the first clock state of each machine cycle. The read control signal $\overline{RD}$ indicates whether a memory or I/O device is to be read and that the data bus is available for data transfer. The write control signal $\overline{WR}$ indicates that the contents of the data bus is ready to be written into the selected memory or I/O location. The IO/$\overline{M}$ status signal indicates that an I/O read or write is occurring and is used to perform the synchronization of the CPUs as indicated above. The -FRZ lead is shown making its transition from logic 1 to logic 0 in response to the IO/$\overline{M}$ signal being logic 1 and a falling edge of the ALE signal.

Machine cycle M1 consists of four states, T1 through T4, since it is an opcode fetch. Machine cycles M2 and M3 each contain three states, T1 through T3, since they respectively constitute a memory read and an I/O write operation.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunication system, a CPU synchronization circuit is connected to a clock of said telecommunication system, said clock being operated to produce at least first and second periodic signals, said CPU synchronization circuit comprising:
   CPU means including at least first and second non-synchronized CPU copies;
   each of said CPU copies including:
      a first clock input lead connecting said clock to said CPU copy and being operated to transmit said first periodic signal to said CPU copy;
      a status output lead;
      an address latch output lead;
      a second clock input lead and being operated to transmit said second periodic signal;
      said CPU copy connected to said clock via said second clock input lead and said CPU copy being operated in response to said first periodic signal to generate a predefined value of said status output lead;
      said CPU copy being further operated in response to said second periodic signal of said clock to execute instructions;
      means for generating an inhibit signal connected to said corresponding CPU copy via said status output lead and said address latch output lead and said means for generating being operated in response to said status output lead predefined value to produce said inhibit signal; and
      gating means connected to said clock via said second clock input lead, to said means for generating and to said corresponding CPU copy, said gating means being operated in response to said inhibit signal to prevent said corresponding CPU copy from executing instructions for one second periodic signal until said first and second CPU copies are synchronously executing instructions.

2. A CPU synchronization circuit as claimed in claim 1, wherein said means for generating includes a J-K flip-flop having a J-input connected to said status output lead, a clock-input connected to said address latch output lead, a K-input lead connected to electronic ground and a $\overline{Q}$-output lead for providing said inhibit signal.

3. A CPU synchronization circuit as claimed in claim 2, said gating means of each said CPU copy including:
   NAND gating means connected to said clock via said second clock input lead and to said $\overline{Q}$-output lead of said J-K flip-flop, said NAND gating means being operated in response to said second periodic signal and to said inhibit signal to selectively transmit said second periodic signal; and
   latching means connected to said NAND gating means, to said corresponding CPU copy and to said clock via said first clock input lead, said latching means being operated in response to said inhibit signal to prevent said execution of said corresponding CPU copy.

4. A CPU synchronization circuit as claimed in claim 3, wherein said latching means of each said CPU copy includes a D-type flip-flop having a D-input connected to said NAND gating means, a clock-input connected to said clock for receiving said first periodic signal and a $\overline{Q}$-output connected to said corresponding CPU copy.

5. A CPU synchronization circuit as claimed in claim 4, wherein each said CPU copy includes a microprocessor CPU.

6. A CPU synchronization circuit as claimed in claim 5, wherein said connection of said corresponding microprocessor CPU to said corresponding D-type flip-flop includes first and second circuit connections to said microprocessor CPU for operating an internal clock of said microprocessor CPU in a push-pull configuration.

7. A CPU synchronization circuit as claimed in claim 1, wherein there is included:
   said clock being operated to produce a third periodic signal;
   each said CPU copy further including:
      a trap input lead connected between said clock and each said CPU copy, said trap input lead being operated to transmit said third periodic signal to each said CPU copy; and
      said CPU copy being periodically operated to initiate generation of said statu output lead predefined valve for cyclically resynchronizing said first and second CPU copies.

8. A CPU synchronization circuit as claimed in claim 2, wherein said third periodic signal is in the frequency range of between 1 Hz and 1 KHz.

9. A CPU synchronization circuit as claimed in claim 1, wherein said first periodic signal is approximately twice in frequency of said second periodic signal.

10. A CPU synchronization circuit as claimed in claim 9, wherein said second periodic signal is in the frequency range of between 1 MHz and 10 MHz and said first periodic signal is in the frequency range of between 10 MHz and 20 MHz, correspondingly.

* * * * *